United States Patent
Hwang et al.

(10) Patent No.: US 10,364,327 B2
(45) Date of Patent: Jul. 30, 2019

(54) POLYORGANOSILOXANE AND COPOLYCARBONATE PREPARED BY USING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Ki Jae Lee, Daejeon (KR); Moo Ho Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/555,914

(22) PCT Filed: Dec. 27, 2016

(86) PCT No.: PCT/KR2016/015341
§ 371 (c)(1),
(2) Date: Sep. 5, 2017

(87) PCT Pub. No.: WO2017/135577
PCT Pub. Date: Aug. 10, 2017

(65) Prior Publication Data
US 2018/0044479 A1 Feb. 15, 2018

(30) Foreign Application Priority Data
Feb. 1, 2016 (KR) .................. 10-2016-0012340
Dec. 26, 2016 (KR) .................. 10-2016-0179496

(51) Int. Cl.
*C08G 77/14* (2006.01)
*C08G 64/18* (2006.01)
(Continued)

(52) U.S. Cl.
CPC ............. *C08G 77/14* (2013.01); *C08G 64/16* (2013.01); *C08G 64/18* (2013.01); *C08G 64/186* (2013.01);
(Continued)

(58) Field of Classification Search
None
See application file for complete search history.

(56) References Cited

U.S. PATENT DOCUMENTS 3,679,774 A * 7/1972 Le Grand ............ C08G 64/186
525/462
4,470,831 A * 9/1984 Hirose ............... B01D 69/12
428/391

(Continued)

FOREIGN PATENT DOCUMENTS

CN 1181081 C 12/2004
CN 103709186 A 4/2014
(Continued)

OTHER PUBLICATIONS

Ahashkin et al. "Investigation of Permeability of Fluorinated Polycarbonate Siloxanes" Petroleum Chemistry 2013, 53(7), 447-453. (Year: 2013).*

(Continued)

*Primary Examiner* — Robert S Loewe
(74) *Attorney, Agent, or Firm* — Dentons US LLP

(57) ABSTRACT

The present invention relates to a novel polyorganosiloxane capable of producing a copolycarbonate having improved chemical resistance and flame retardancy while maintaining the intrinsic physical properties of a polycarbonate resin and to a copolycarbonate prepared by using the same.

10 Claims, 4 Drawing Sheets

(51) Int. Cl.
  *C08G 77/448* (2006.01)
  *C08J 5/00* (2006.01)
  *C08G 64/16* (2006.01)
  *C08G 77/04* (2006.01)
  *C08G 77/16* (2006.01)
  *C08G 77/24* (2006.01)

(52) U.S. Cl.
  CPC ............ *C08G 77/04* (2013.01); *C08G 77/16* (2013.01); *C08G 77/24* (2013.01); *C08G 77/448* (2013.01); *C08J 5/00* (2013.01)

(56) References Cited

U.S. PATENT DOCUMENTS

| | | | | |
|---|---|---|---|---|
| 5,025,074 | A * | 6/1991 | Davis | C08G 64/186 528/15 |
| 5,380,795 | A * | 1/1995 | Gosens | C08L 51/04 525/147 |
| 5,455,310 | A * | 10/1995 | Hoover | C08L 69/00 525/425 |
| 5,608,026 | A * | 3/1997 | Hoover | C08G 77/448 528/26 |
| 6,072,011 | A * | 6/2000 | Hoover | C08G 77/448 524/162 |
| 6,492,481 | B1 * | 12/2002 | Davis | C08G 64/085 525/464 |
| 6,630,562 | B2 * | 10/2003 | Ogawa | C08G 64/085 528/10 |
| 6,657,018 | B1 | 12/2003 | Hoover | |
| 7,232,854 | B2 * | 6/2007 | Ma | C08L 83/10 524/127 |
| 7,491,346 | B2 * | 2/2009 | Hikosaka | C08G 64/186 252/501.1 |
| 7,799,855 | B2 * | 9/2010 | Ebeling | C08L 83/10 524/127 |
| 8,802,804 | B2 * | 8/2014 | Kim | C08G 64/186 528/25 |
| 9,062,164 | B2 * | 6/2015 | Kim | C08G 77/48 |
| 9,400,428 | B2 * | 7/2016 | Urano | G03F 7/038 |
| 9,580,597 | B2 * | 2/2017 | Jeong | C08G 64/24 |
| 9,732,186 | B2 * | 8/2017 | Bahn | C08G 64/186 |
| 9,969,841 | B2 * | 5/2018 | Hwang | C08G 77/448 |
| 2003/0125497 | A1 | 7/2003 | Kunzler et al. | |
| 2005/0101757 | A1 * | 5/2005 | Glasgow | C08L 69/00 528/196 |
| 2005/0165187 | A1 | 7/2005 | Kunzler et al. | |
| 2007/0270561 | A1 | 11/2007 | Kunzler et al. | |
| 2008/0190507 | A1 * | 8/2008 | Hardy | B32B 1/08 138/134 |
| 2009/0036593 | A1 | 2/2009 | DeRudder et al. | |
| 2011/0115110 | A1 | 5/2011 | Kunzler et al. | |
| 2012/0309922 | A1 | 12/2012 | Kim et al. | |
| 2014/0061533 | A1 * | 3/2014 | Schultz Hume | C08K 5/005 252/299.01 |
| 2014/0249280 | A1 | 9/2014 | Kim et al. | |
| 2014/0275314 | A1 * | 9/2014 | Morizur | C08L 77/00 522/35 |
| 2015/0291738 | A1 * | 10/2015 | Sugiura | C08G 64/18 525/462 |
| 2015/0344623 | A1 * | 12/2015 | Park | C08G 64/1666 528/29 |
| 2016/0122477 | A1 | 5/2016 | Rhee et al. | |

FOREIGN PATENT DOCUMENTS

| | | |
|---|---|---|
| JP | 7-53702 A | 2/1995 |
| JP | 7-91375 B2 | 10/1995 |
| JP | 8-234468 A | 9/1996 |
| JP | 10-20522 A | 1/1998 |
| JP | 2005-507963 A | 3/2005 |
| JP | 2005-519177 A | 6/2005 |
| KR | 10-2013-0047332 A | 5/2013 |
| KR | 10-2013-0077772 A | 7/2013 |
| KR | 10-1289201 B1 | 7/2013 |
| KR | 10-1432677 B1 | 8/2014 |
| KR | 10-2014-0146694 A | 12/2014 |
| KR | 10-2015-0119823 A | 10/2015 |
| KR | 10-2015-0124257 A | 11/2015 |
| KR | 10-2017-0004819 A | 1/2017 |
| TW | 200923010 A | 6/2009 |
| WO | 2011/122767 A2 | 10/2011 |
| WO | WO-2015193862 A1 * | 12/2015 ............ C08G 63/64 |

OTHER PUBLICATIONS

D. O. Anashkin et al., "Fluorine-Containing Poly(carbonate-block-siloxane) Copolymers", Polymer Science, Ser. B, 2012, vol. 54, Nos. 1-2, pp. 94-98.

* cited by examiner

POLYORGANOSILOXANE AND COPOLYCARBONATE PREPARED BY USING THE SAME

CROSS-REFERENCE TO RELATED APPLICATION(S)

This application is a National Stage Application of International Application No. PCT/KR2016/015341 filed on Dec. 27, 2016, which claims the benefit of Korean Patent Application No. 10-2016-0012340 filed on Feb. 1, 2016 and Korean Patent Application No. 10-2016-0179496 filed on Dec. 26, 2016, all of which are hereby incorporated by reference in their entirety for all purposes as if fully set forth herein.

TECHNICAL FIELD

The present invention relates to a novel polyorganosiloxane capable of producing a copolycarbonate having improved chemical resistance and flame retardancy and to a copolycarbonate prepared by using the same.

BACKGROUND OF ART

Polyorganosiloxane, which is a kind of silicone, means a polymer having a siloxane linkage substituted with organic groups as a backbone. As an example, it is produced by polycondensation of an aromatic diol such as bisphenol A and a carbonate precursor such as phosgene, is colorless and odorless, is slow to oxidize, is a hypoallergenic insulator that is stable even at room temperature, and is used as electrics, electronics, automobiles, machinery, medicines, cosmetics, lubricants, adhesives, gaskets, plastic artificial aids and the like.

In addition, it has excellent impact strength, dimensional stability, thermal resistance and transparency, and is applied to a wide range of fields such as exterior materials of electrical and electronic products, automotive parts, construction materials, optical components, and the like. Recently, in order to apply these polycarbonate resins to more various fields, many attempts have been made to obtain desired physical properties by copolymerizing two or more aromatic diols having different structures from each other and introducing units having different structures in a main chain of the polycarbonate.

However, as the application field of the copolycarbonate is expanded, the required level of chemical resistance and flame retardancy of the copolycarbonate are gradually increased. Accordingly, there is a need to develop a copolycarbonate having a novel structure capable of improving the chemical resistance and flame retardancy while maintaining the intrinsic physical properties of the copolycarbonate.

DETAILED DESCRIPTION OF THE INVENTION

Technical Problem

It is an object of the present invention to provide a novel polyorganosiloxane capable of producing a copolycarbonate having improved chemical resistance and flame retardancy.

It is another object of the present invention to provide a copolycarbonate produced using the above-described polyorganosiloxane.

It is a further object of the present invention to provide a molded article produced using the copolycarbonate.

Technical Solution

In order to achieve the above object, the present invention provides a polyorganosiloxane represented by Chemical Formula 1 below. Also, the present invention provides a polyorganosiloxane represented by Chemical Formula 2 below.

Further, the present invention provides a copolycarbonate comprising (i) a repeating unit represented by Chemical Formula 3 below or a repeating unit represented by Chemical Formula 4 below, and (ii) a repeating unit represented by Chemical Formula 5 below, wherein the copolycarbonate has a weight average molecular weight of 1,000 to 1,000,000 g/mol.

In addition, the present invention provides a molded article produced using the copolycarbonate.

Hereinafter, the polyorganosiloxane, the copolycarbonate and the molded article according to specific embodiments of the present invention will be described in more detail.

According to one embodiment of the present invention, there is provided a polyorganosiloxane represented by Chemical Formula 1 below.

[Chemical Formula 1]

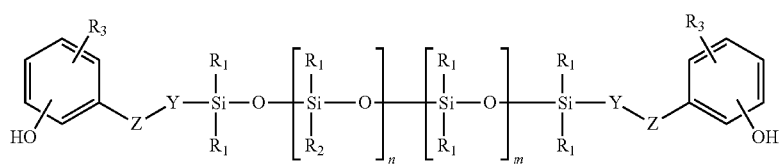

in the Chemical Formula 1, each of $R_1$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, $R_2$ is $C_{1-16}$ alkyl substituted with one to three fluoro, each of $R_3$ is independently hydrogen, $C_{1-6}$ alkyl, halogen, hydroxy, $C_{1-6}$ alkoxy, or $C_{6-20}$ aryl, Y is $C_{1-10}$ alkylene, Z is a bond, or —COO—, n is an integer of 1 to 2000, and m is an integer of 1 to 2,000.

According to another embodiment of the invention, there is provided a polyorganosiloxane represented by Chemical Formula 2 below.

B-A-B     [Chemical Formula 2]

in the Chemical Formula 2,

A is a divalent functional group containing $C_{6-20}$ arylene,

B is

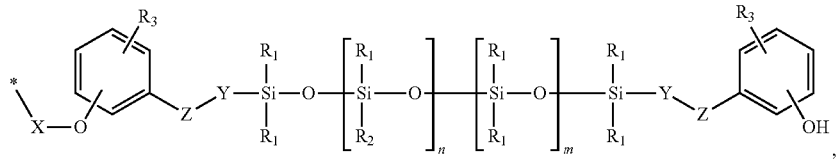

each of R₁ is independently hydrogen; $C_{1-15}$ alkyl unsubstituted or substituted with oxiranyl, oxiranyl-substituted or $C_{6-20}$ aryl; halogen; $C_{1-10}$ alkoxy; allyl; $C_{1-10}$ haloalkyl; or $C_{6-20}$ aryl, R₂ is $C_{1-15}$ alkyl substituted with one to three fluoro, each of R₃ is independently hydrogen, $C_{1-6}$ alkyl, halogen, hydroxy, $C_{1-6}$ alkoxy, or $C_{6-20}$ aryl, X is —CO—, or —CO—($C_{6-10}$ arylene)-CO—, Y is $C_{1-10}$ alkylene, Z is a bond, or —COO—, n is an integer of 1 to 2000, and m is an integer of 1 to 2,000.

Polyorganosiloxane, which is a kind of silicone, means a polymer having a siloxane linkage substituted with organic groups as a backbone. Among these polyorganosiloxanes, particularly, the polyorganosiloxane represented by Chemical Formula 1 or 2 according to the one embodiment of the invention can exhibit both excellent ductility due to the silicone monomer and excellent chemical resistance effect due to the alkyl group substituted with fluoro introduced in the side chain. Accordingly, the polyorganosiloxane can further exhibit the effects of improving ductility, chemical resistance and flame retardancy, while being excellent in impact resistance, transparency and the like which are the intrinsic properties of a conventional polycarbonate.

On the other hand, the compound represented by Chemical Formula 2 has a structure in which the compound represented by Chemical Formula 1 is bonded via a linker, and a method for preparing the compound will be described later.

Further, in the Chemical Formula 1 or 2, R₂ is $C_{1-15}$ alkyl substituted with one to three fluoro, more preferably —$(CH_2)_p CH_q F_r$—, wherein p is an integer of 1 to 10, q and r is an integer of 0 to 3, and q r is 3. Also, most preferably, R₂ is —$(CH_2)_2 CF_3$.

Also, in the Chemical Formula 1 or 2, each of R₁ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

Also preferably, each of R₁ is independently $C_{1-10}$ alkyl, more preferably $C_{1-6}$ alkyl, still more preferably $C_{1-3}$ alkyl, and most preferably methyl.

Also, in the Chemical Formula 1 or 2, Y is $C_{1-10}$ alkylene, and more preferably $C_{1-5}$ alkylene.

Also preferably, in the Chemical Formula 1 or 2, n and m are integers of 10 or more, 15 or more, 20 or more, 25 or more, 30 or more, 31 or more, or 32 or more, and 1500 or less, 1000 or less, 900 or less, 800 or less, 700 or less, 600 or less, 500 or less, 400 or less, 300 or less, 200 or less, 100 or less, 99 or less, 90 or less, 80 or less, 70 or less, 60 or less, 50 or less, 45 or less, 40 or less, 39 or less, 38 or less, or 37 or less.

Also, in the Chemical Formula 2, A is a divalent functional group containing $C_{6-20}$ arylene, and more preferably

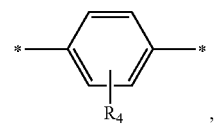

wherein R₄ is hydrogen, $C_{1-6}$ alkyl, halogen, hydroxy, $C_{1-6}$ alkoxy, or $C_{6-20}$ aryl.

In addition, specific examples of the polyorganosiloxane represented by the Chemical Formula 1 include a compound of the following structure:

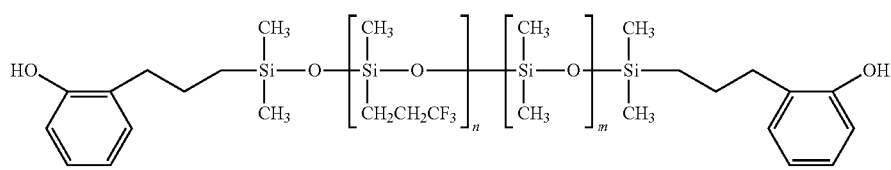

Further, specific examples of the polyorganosiloxane represented by the Chemical Formula 2 include a compound of the following structure:

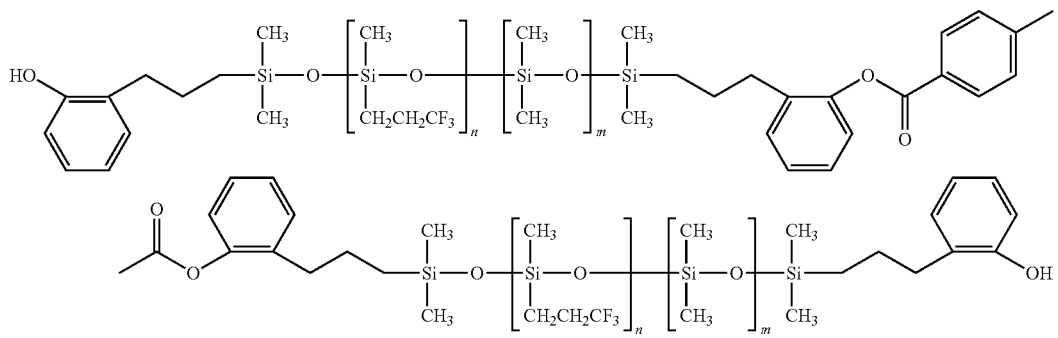

According to another embodiment of the present invention, there is provided a copolycarbonate comprising (i) a repeating unit represented by Chemical Formula 3 below or a repeating unit represented by Chemical Formula 4 below, and (ii) a repeating unit represented by Chemical Formula 5 below, wherein the copolycarbonate has a weight average molecular weight of 1,000 to 1,000,000 g/mol.

[Chemical Formula 3]

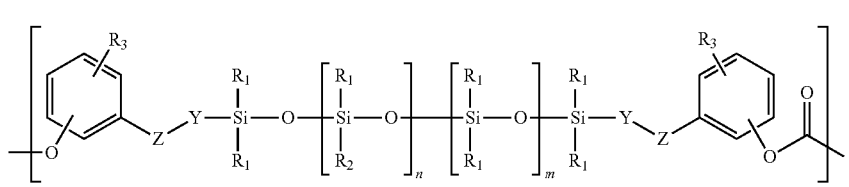

in the Chemical Formula 3, $R_1$ to $R_3$, Y, Z, n and m are as defined above,

[Chemical Formula 4]

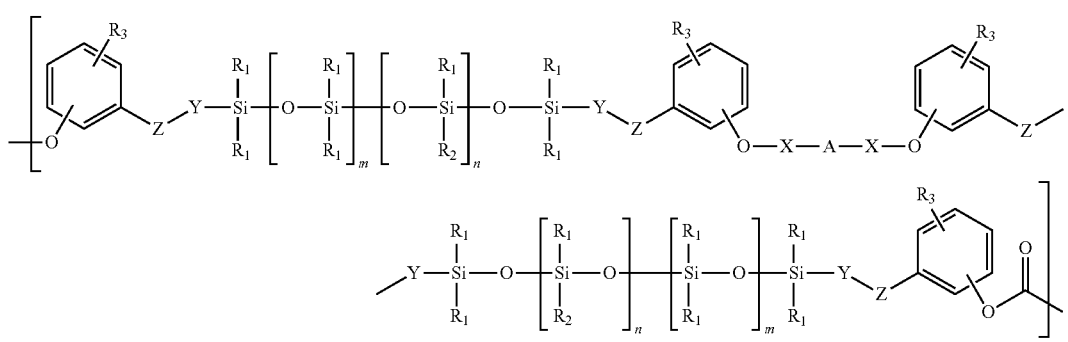

in the Chemical Formula 4, A, $R_1$ to $R_3$, X, Y, Z, n and m are as defined above,

[Chemical Formula 5]

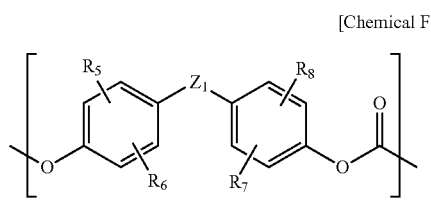

in the Chemical Formula 5, $R_5$ to $R_8$ are each independently hydrogen, $C_{1-10}$ alkyl, $C_{1-10}$ alkoxy, or halogen, $Z_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In the Chemical Formula 5, $R_5$ to $R_8$ are each independently hydrogen, methyl, chloro, or bromo. Also preferably, $Z_1$ is a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Also preferably, $Z_1$ is cyclohexane-1,1-diyl, O, S, SO, $SO_2$, or CO.

The copolycarbonate of the one embodiment of the invention is prepared by polymerizing the polyorganosiloxane represented by the Chemical Formula 1 or 2, the aromatic diol compound and the carbonate precursor. As described above, the polyorganosiloxane can further exhibit the effects of improving flame retardancy, chemical resistance and the like due to the alkyl group substituted with fluoro introduced in the side chain of the polyorganosiloxane represented by the Chemical Formula 1 or 2 while maintaining excellent impact resistance, transparency and the like which are the intrinsic properties of a conventional polycarbonate.

Preferably, the copolycarbonate has a weight average molecular weight (g/mol) of 20,000 or more, 21,000 or more, 22,000 or more, 23,000 or more, 24,000 or more, 25,000 or more, 26,000 or more, 27,000 or more, or 28,000 or more, and 900,000 or less, 800,000 or less, 700,000 or less, 600,000 or less, 500,000 or less, 400,000 or less, 300,000 or less, 200,000 or less, 100,000 or less, 90,000 or less, 80,000 or less, 70,000 or less, 60,000 or less, 50,000 or less, 40,000 or less, 34,000 or less, 33,000, or 32,000 or less.

The aromatic diol compound is a compound represented by Chemical Formula 6 below, which corresponds to the Chemical Formula 5.

[Chemical Formula 6]

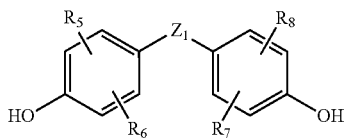

in the Chemical Formula 6, $Z_1$ and $R_5$ to $R_8$ are as defined in the Chemical Formula 5.

Specific examples of the aromatic diol compound may include bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulphide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlororophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, or 1,1-bis(4-hydroxyphenyl)-1-phenylethane. Preferably, the aromatic diol compound is 2,2-bis(4-hydroxyphenyl)propane (bisphenol A).

The carbonate precursor serves to link the compound represented by the Chemical Formula 1 or 2 and the compound represented by the Chemical Formula 6, and specific examples thereof may include phosgene, triphosgene, diphosgene, bromophosgene, dimethyl carbonate, diethyl carbonate, dibutyl carbonate, dicyclohexyl carbonate, diphenyl carbonate, ditolyl carbonate, bis(chlorophenyl)carbonate, m-cresyl carbonate, dinaphthyl carbonate, bis(diphenyl) carbonate or bishaloformate.

In addition, the copolycarbonate of the one embodiment of the invention can be produced by a method which comprises polymerizing a composition including the polyorganosiloxane represented by the Chemical Formula 1 or 2, the aromatic diol compound and the carbonate precursor.

During the polymerization, the polyorganosiloxane represented by the Chemical Formula 1 or 2 is used in an amount of 0.1 wt. % or more, 1 wt. % or more, or 3 wt. % or more, and 20 wt. % or less, 10 wt. % or less, or 7 wt. % or less, based on 100 wt. % of the composition.

Further, the aromatic diol compound may be used in an amount of 40 wt. % or more, 50 wt. % or more, or 55 wt. % or more, and 80 wt. % or less, 70 wt. % or less, or 65 wt. % or less, based on 100 wt. % of the composition.

The carbonate precursor may be used in an amount of 10 wt. % or more, 20 wt. % or more, or 30 wt. %, and 60 wt. % or less, 50 wt. % or less, or 40 wt. % or less, based on the 100 wt. % of the composition.

In this case, the polymerization is preferably carried out by an interfacial polymerization, and a polymerization reaction is possible at normal pressure and low temperature during the interfacial polymerization, and adjustment of molecular weight is easy. Further, the interfacial polymerization may include, for example, adding a coupling agent after pre-polymerization, and then carrying out polymerization, and in this case, a high molecular weight copolycarbonate resin may be obtained.

It is preferable that the polymerization temperature is 0° C. to 40° C., and the reaction time is 10 minutes to 5 hours. Further, it is preferable to maintain pH to at least 9, or at least 11 during reaction.

The solvent that can be used for the polymerization is not particularly limited as long as it is a solvent used for the polymerization of polycarbonate in this technical field, and for example, halogenated hydrocarbons such as methylene chloride and chlorobenzene can be used.

Further, the polymerization is preferably carried out in the presence of an acid binder, and examples of the acid binder may include an alkali metal hydroxide such as sodium hydroxide or potassium hydroxide, or an amine compound such as pyridine.

In addition, in order to adjust the molecular weight of the copolycarbonate during the polymerization, the polymerization is preferably carried out in the presence of a molecular weight regulator. As the molecular weight regulator, $C_{1-20}$ alkylphenol can be used, and specific examples thereof include p-tert-butylphenol, p-cumylphenol, decylphenol, dodecylphenol, tetradecylphenol, hexadecylphenol, octadecylphenol, eicosylphenol, docosylphenol and triacontylphenol. The molecular weight regulator may be added before the initiation of polymerization, during the initiation of polymerization, or after the initiation of polymerization. The above molecular weight regulator is contained, for example, in an amount of 0.01 part by weight or more, 0.1 part by weight or more, or 1 part by weight or more; and 10 parts by weight or less, 6 parts by weight or less, or 5 parts by weight or less, based on 100 parts by weight of the aromatic diol compound. Within this range, the required molecular weight can be obtained.

Further, in order to accelerate the polymerization reaction, a reaction accelerator, for example, a tertiary amine compound such as triethylamine, tetra-n-butyl ammonium bromide and tetra-n-butylphosphonium bromide, or a quaternary ammonium compound, or a quaternary phosphonium compound may be further used.

In addition, the present invention provides a molded article produced using the above-mentioned copolycarbonate. As described above, the molded article of the present invention exhibits increased chemical resistance and flame retardancy simultaneously while maintaining the intrinsic

DETAILED DESCRIPTION OF THE EMBODIMENTS

Hereinafter, preferred examples are presented to assist in understanding of the present invention. However, these examples are for illustrative purposes only and are not intended to limit the scope of the invention.

Example 1

(1) Preparation of Modified Polyorganosiloxane

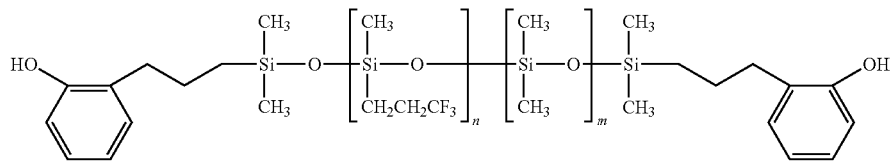

properties of the copolycarbonate due to the fluorocarbon-derived structure in the polyorganosiloxane represented by the Chemical Formula 1 or 2, and thereby the application field thereof is broader as compared with a molded article produced using a copolycarbonate previously used in the art.

In addition to the copolycarbonate according to the present invention, the above-mentioned molded article may further include one or more selected from the group consisting of an antioxidant, a plasticizer, an antistatic agent, a nucleating agent, a flame retardant, a lubricant, an impact reinforcing agent, a fluorescent whitening agent, a ultraviolet absorber, a pigment and a dye.

The method for preparing the article may include, for example, the steps of mixing the copolycarbonate according to the present invention and other additives using a mixer, extrusion-molding the mixture with an extruder to produce a pellet, drying the pellet and then injecting the dried pellet with an injection molding machine.

Advantageous Effects

The novel polyorganosiloxane according to the present invention can be used as a monomer of a copolycarbonate, and at the same time improve the chemical resistance and flame retardancy while maintaining the intrinsic physical properties of the copolycarbonate such as ductility.

Figure 1:
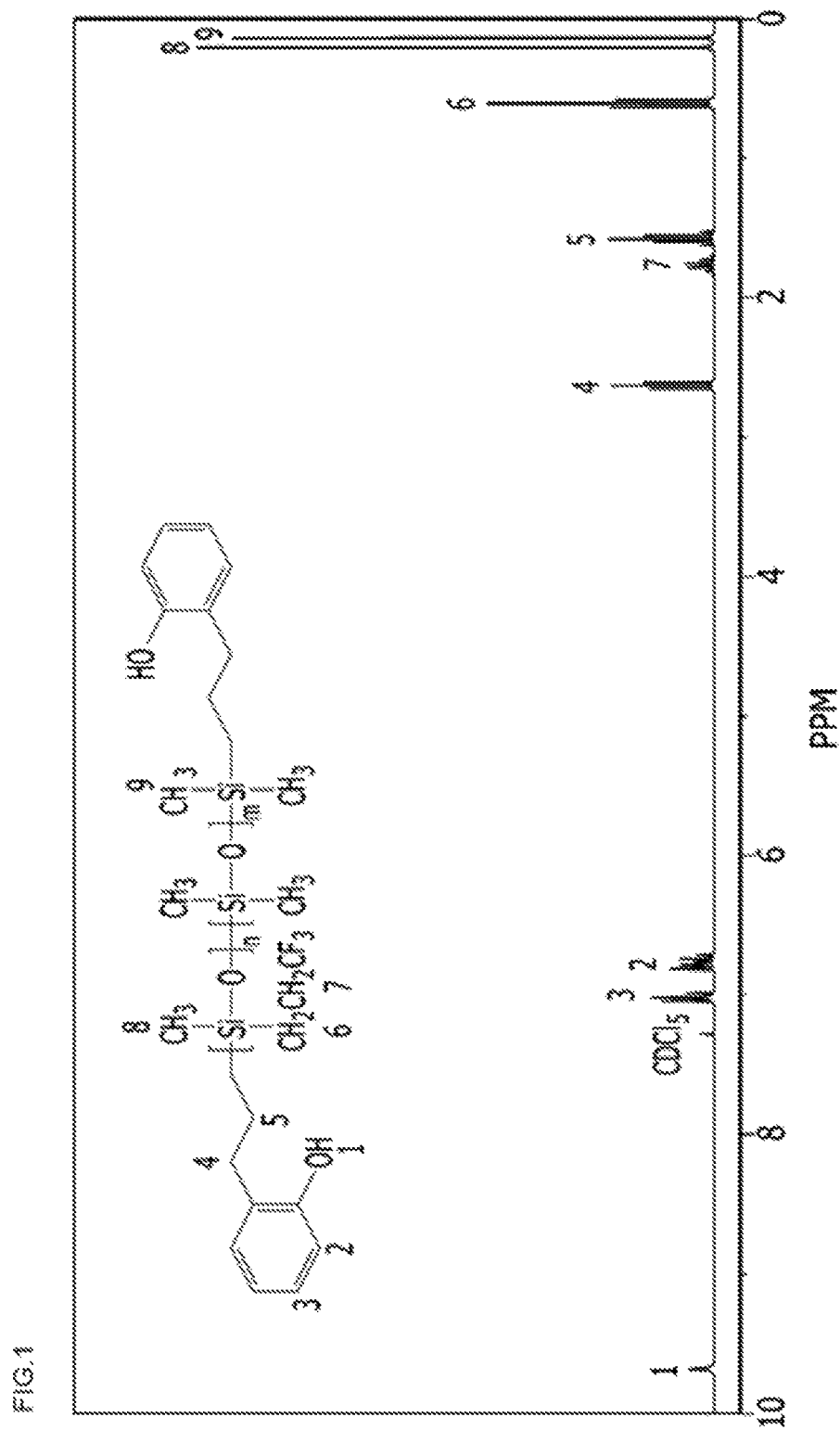
FIG. 1 shows a $^1$H-NMR graph of the compound prepared in Example

35.70 g of the sum of octamethylcyclotetrasiloxane and poly(methyl-trifluoropropyl)dimethylsiloxane was mixed with 2.40 g (17.8 mmol) of tetramethyldisiloxane. The mixture was then placed in 3 L flask together with 1 part by weight of an acid day (DC-A3) compared to 100 parts by weight of the sum of octamethylcyclotetrasiloxane and poly(methyl-trifluoropropyl)dimethylsiloxane, and reacted at 60° C. for 4 hours. After completion of the reaction, the reaction product was diluted with ethyl acetate and quickly filtered using a celite. The repeating unit (sum of n and m) of the unmodified polyorganosiloxane thus obtained was 50 when confirmed through $^1$H NMR (FIG. 1).

To the resulting terminal-unmodified polyorganosiloxane, 0.01 g (50 ppm) of Karstedt's platinum catalyst were added and reacted at 90° C. for 3 hours. Then, 4.81 g (35.9 mmol) of 2-allylphenol was further added thereto and reacted for 3 hours. After completion of the reaction, the unreacted siloxane was removed by conducting evaporation under the conditions of 120° C. and 1 torr. Thereby, the terminal-modified polyorganosiloxane having a liquid, pale yellow transparent property was obtained.

Figure 2:
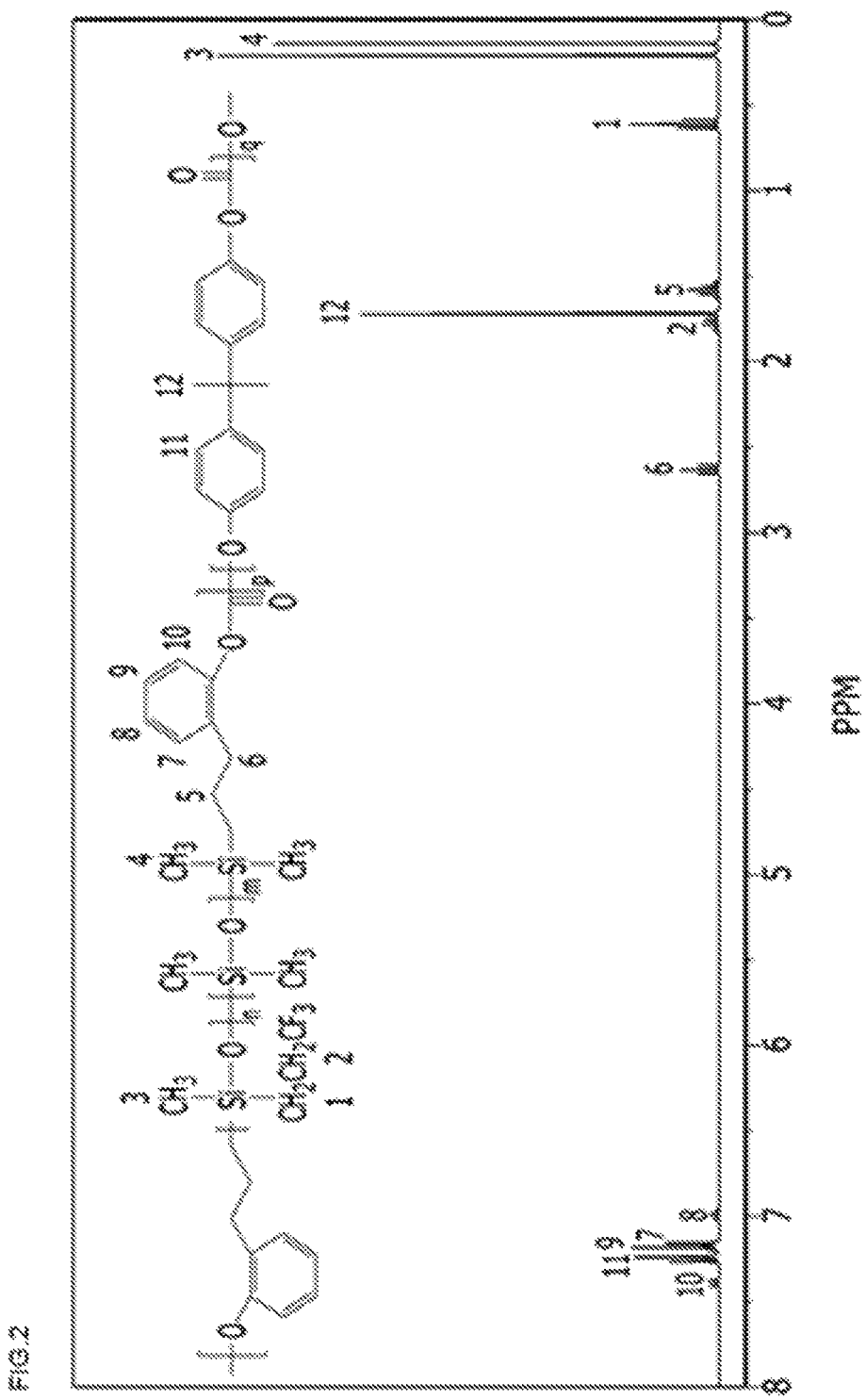
FIG. 2 shows a $^1$H-NMR graph of the copolycarbonate prepared in Example 1.

(2) Preparation of Copolycarbonate 232 g of bisphenol A, 1,784 g of distilled water and 385 g of sodium hydroxide were added to a polymerization reactor and mixed under a nitrogen atmosphere to completely dissolve bisphenol A. Then, 875 g of methylene chloride, 4.3 g of PTBP (para-tert butylphenol) and 13.4 g of the compound prepared in Step 1 above was added and mixed. To this mixture, 920 g of methylene chloride in which 130 g of TPG (triphosgene) was dissolved was added dropwise for one hour. At this time, a sodium hydroxide aqueous solution was maintained at pH 11. After completion of the dropwise addition, the reaction product was aged for 15 minutes, and 46 g of triethylamine was dissolved in methylene chloride and added. After a total reaction time of 1 hour and 30 minutes, pH was lowered to 4, and then washed three times with distilled water. Subsequently, the methylene chloride phase was separated. The polymer thus obtained was precipitated in methanol and dried at 120° C.

to obtain a final powdery copolycarbonate resin. The preparation thereof was confirmed through ¹H NMR (FIG. 2).

Example 2

(1) Preparation of Modified Polyorganosiloxane

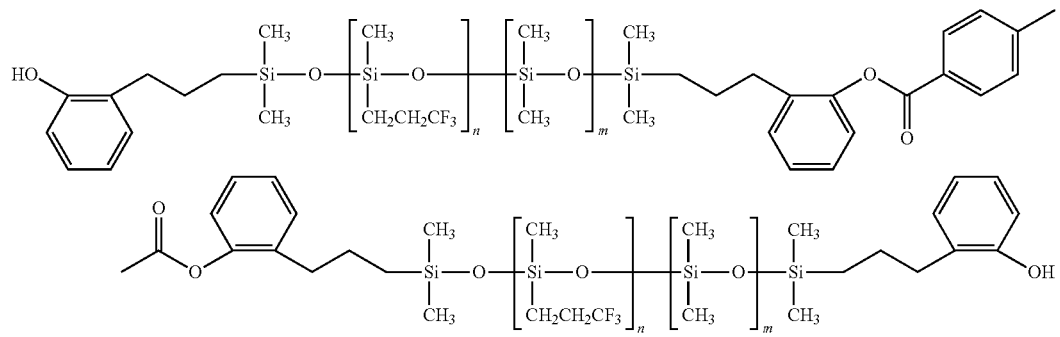

Figure 3:
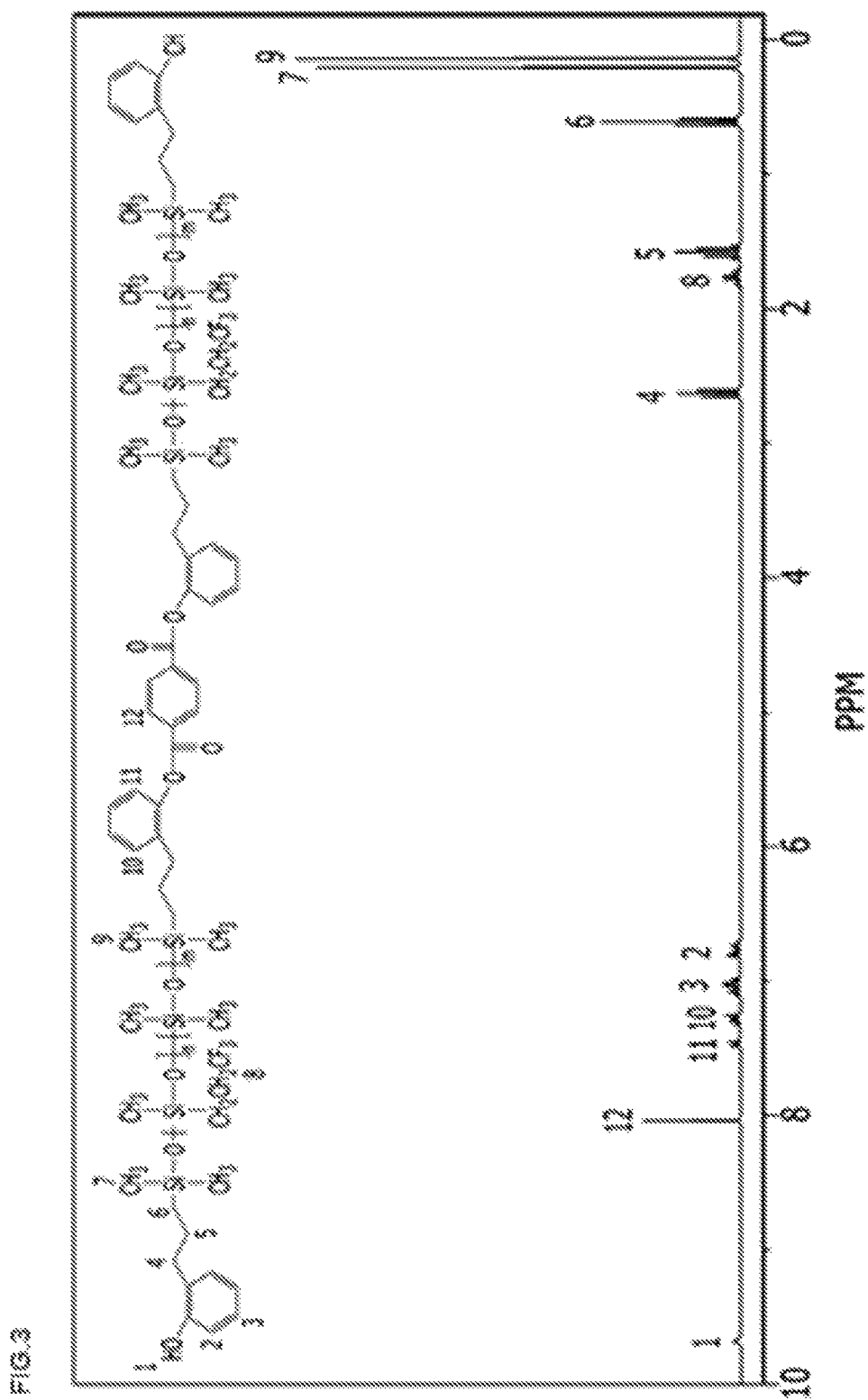
FIG. 3 shows a $^1$H-NMR graph of the compound prepared in Example 2.

The terminal-modified polyorganosiloxane was obtained in the same manner as in Step 1 of Example 1. Subsequently, 1,000 mL (based on liquid) of chloroform (CHCl$_3$) was added to a refluxable 2,000 mL three-necked flask, and 7.1 g of terephthaloyl chloride was dissolved slowly for 1 hour while maintaining nitrogen atmosphere at room temperature (20 to 26° C.). Then, 25 g of triethylamine was added thereto and allowed to react for 1 hour, and then 175 g of the above modified polyorganosiloxane was added and sufficiently reacted to prepare a compound represented by the above chemical formula. The preparation thereof was confirmed through ¹H NMR (FIG. 3).

Figure 4:
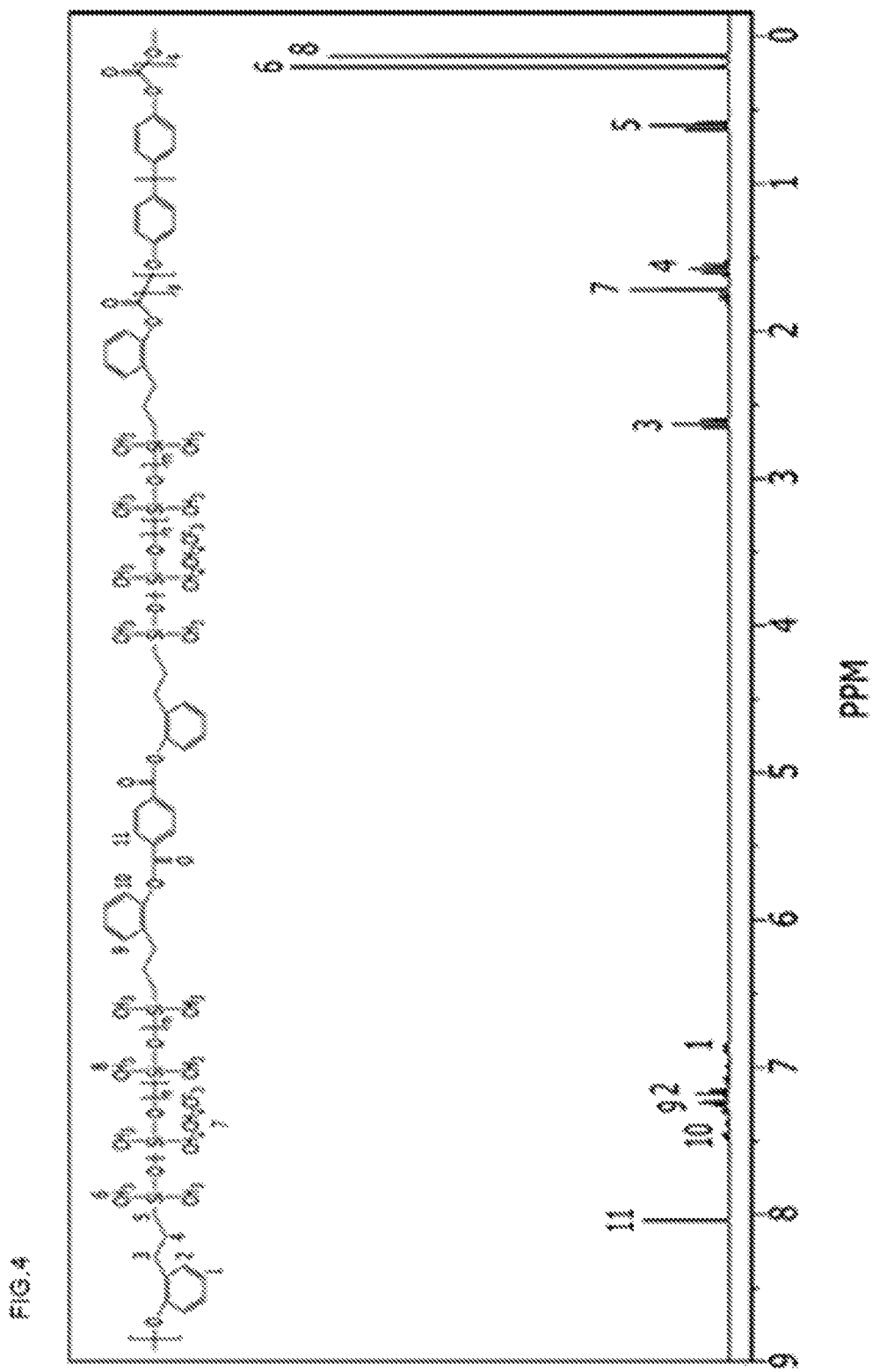
FIG. 4 shows a $^1$H-NMR graph of the copolycarbonate prepared in Example 2.

(2) Preparation of Copolycarbonate Resin 232 g of bisphenol A, 1,784 g of distilled water and 385 g of sodium hydroxide were added to a polymerization reactor and mixed under a nitrogen atmosphere to completely dissolve bisphenol A. Then, 875 g of methylene chloride, 4.3 g of PTBP (para-tert butylphenol) and 7.0 g of the compound prepared in Step 1 above (5.2 wt. % of polycarbonate resin based on the solid content) was added and mixed. To this mixture, 920 g of methylene chloride in which 130 g of TPG (triphosgene) was dissolved was added dropwise for one hour. At this time, a sodium hydroxide aqueous solution was maintained at pH 11. After completion of the dropwise addition, the reaction product was aged for 15 minutes, and 46 g of triethylamine was dissolved in methylene chloride and added. After a total reaction time of 1 hour and 30 minutes, pH was lowered to 4, and then washed three times with distilled water. Subsequently, the methylene chloride phase was separated. The polymer thus obtained was precipitated in methanol and dried at 120° C. to obtain a final powdery copolycarbonate resin. The preparation thereof was confirmed through ¹H NMR (FIG. 4).

Example 3

The powdery copolycarbonate was prepared in the same manner as in Example 2, except that 3.5 g (2.6 wt. % of polycarbonate resin based on the solid content) was used instead of 7.0 g of the compound prepared in Step 1, in Step 2 of Example 2.

Comparative Example 1

The powdery copolycarbonate was prepared in the same manner as in Example 2, except that the compound prepared in Step 2 was not used, in Step 2 of Example 2.

Experimental Example: Evaluation of Physical Properties of Copolycarbonate Resin The physical properties of the injection-molded specimens of the copolycarbonates prepared in Examples and Comparative Examples were determined in the following manner and the results were shown in Table 1 below.

Weight average molecular weight (g/mol): measured by PC Standard using Agilent 1200 series.

Repeating unit: determined by ¹H-NMR using Varian 500 MHz.

Chemical resistance: The amount of weight reduction was measured by contacting the solvent for 168 hours according to ASTM D 543 method (evaluation criteria: ⊚—Excellent (reduced by 1 to 3 wt. %), ○—Good (reduced by 3 to 10. wt %), Δ—Poor (reduced by 10 wt. % or more).

Impact strength at room temperature and impact strength at low temperature (J/m): measured at 23° C. and −30° C. according to ASTM D256 (⅛ inch, Notched Izod).

Melt Index (MI): measured according to ASTM D 1238 (conditions of 300° C. and 1.2 kg).

Flame retardancy: measured according to L 94 method.

TABLE 1

| | | Example 1 | Example 2 | Example 3 | Comparative Example |
|---|---|---|---|---|---|
| Weight average molecular weight (g/mol) | | 32,300 | 30,400 | 29,800 | 29,500 |
| Chemical resistance | HCl | ⊚ | ⊚ | ⊚ | Δ |
| | NaOH | ○ | ○ | ○ | Δ |

TABLE 1-continued

|  |  | Example 1 | Example 2 | Example 3 | Comparative Example |
|---|---|---|---|---|---|
| (solvent) | MeOH | ◉ | ◉ | ○ | Δ |
|  | Toluene | Δ | ○ | Δ | Δ |
| Impact strength (kg · cm/cm) | 23° C. | 72 | 78 | 72 | 78 |
|  | −30° C. | 68 | 67 | 48 | 11 |
| Melt Index g/10 min) |  | 13 | 9 | 10 | 8 |
| Flame retardancy |  | V-0 | V-0 | V-0 | V-2 |

The invention claimed is:

1. A polyorganosiloxane represented by Chemical Formula 2:

B-A-B  [Chemical Formula 2]

wherein, in Chemical Formula 2,
A is a divalent functional group containing $C_{6-20}$ arylene,
B is

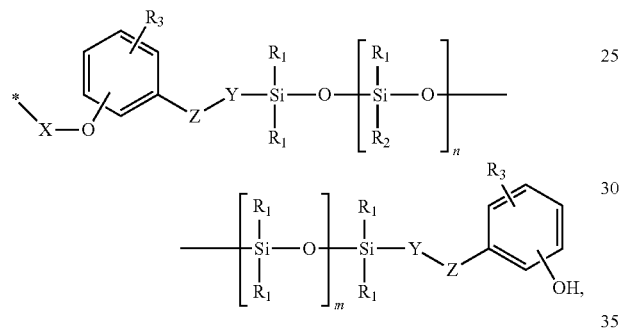

each of $R_1$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl,
$R_2$ is $C_{1-15}$ alkyl substituted with one to three fluoro,
each of $R_3$ is independently hydrogen, $C_{1-6}$ alkyl, halogen, hydroxy, $C_{1-6}$ alkoxy, or $C_{6-20}$ aryl,
X is —CO—, or —CO—($C_{6-10}$ arylene)-CO—,
Y is $C_{1-10}$ alkylene,
Z is a bond, or —COO—,
n is an integer of 1 to 2000, and
m is an integer of 1 to 2,000.

2. The polyorganosiloxane according to claim 1, wherein $R_2$ in Chemical Formula 2 is —$(CH_2)_p CH_q F_r$, wherein p is an integer of 1 to 10, q and r is an integer of 0 to 3, and q+r is 3.

3. The polyorganosiloxane according to claim 1, wherein A in Chemical Formula 2 is

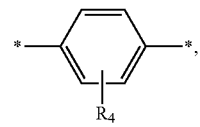

wherein $R_4$ is hydrogen, $C_{1-6}$ alkyl, halogen, hydroxy, $C_{1-6}$ alkoxy, or $C_{6-20}$ aryl.

4. The polyorganosiloxane according to claim 1, wherein each of $R_1$ in Chemical Formula 2 is independently $C_{1-10}$ alkyl.

5. The polyorganosiloxane according to claim 1, wherein Y in Chemical Formula 2 is $C_{1-5}$ alkylene.

6. The polyorganosiloxane according to claim 1, wherein the polyorganosiloxane is a compound of the following structure:

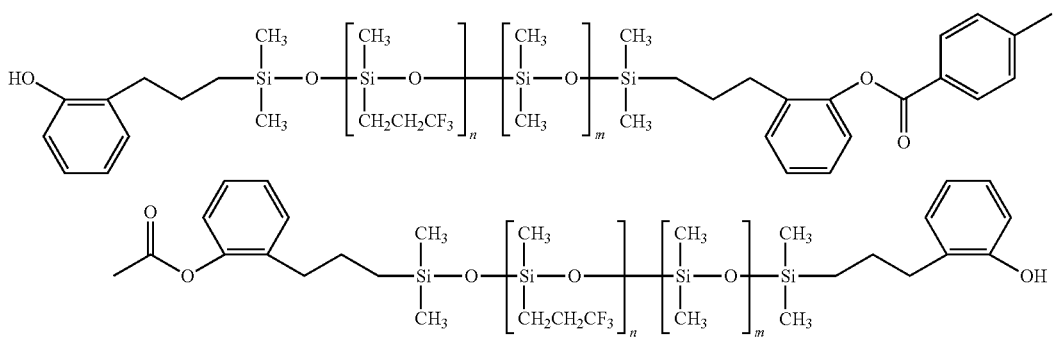

wherein n and m are as defined in claim 1.

7. A copolycarbonate comprising (i) a repeating unit represented by Chemical Formula 4, and (ii) a repeating unit represented by Chemical Formula 5, wherein the copolycarbonate has a weight average molecular weight of 1,000 to 1,000,000 g/mol:

[Chemical Formula 4]

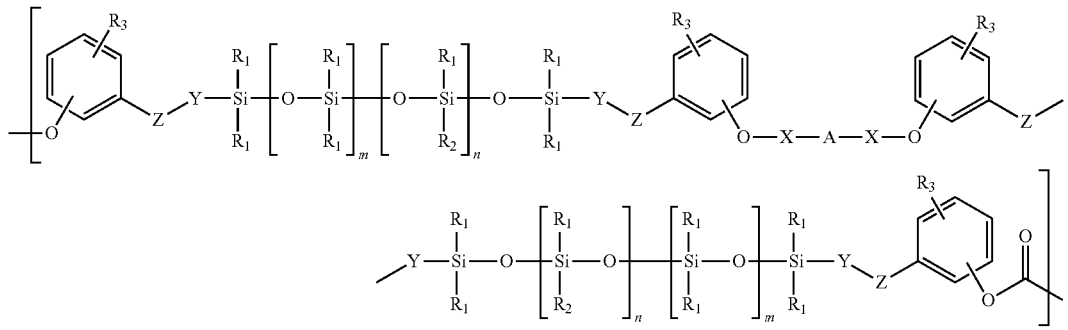

wherein, in Chemical Formula 4,
A is a divalent functional group containing $C_{6-20}$ arylene,
each of $R_1$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl,
$R_2$ is $C_{1-15}$ alkyl substituted with one to three fluoro,
each of $R_3$ is independently hydrogen, $C_{1-6}$ alkyl, halogen, hydroxy, $C_{1-6}$ alkoxy, or $C_{6-20}$ aryl,
X is —CO—, or —CO—($C_{6-10}$ arylene)-CO—,
Y is $C_{1-10}$ alkylene,
Z is a bond, or —COO—,
n is an integer of 1 to 2000, and
m is an integer of 1 to 2,000,

[Chemical Formula 5]

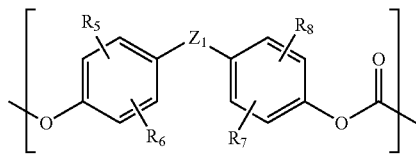

wherein, in Chemical Formula 5,
$R_5$ to $R_8$ are each independently hydrogen, $C_{1-10}$ alkyl, $C_{1-10}$ alkoxy, or halogen, and
$Z_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

8. The copolycarbonate according to claim 7,
wherein the repeating unit represented by Chemical Formula 5 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulphide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlororophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

9. A molded article comprising the copolycarbonate of claim 8.

10. A molded article comprising the copolycarbonate of claim 7.

* * * * *